US008707998B2

(12) United States Patent
Golovatai-Schmidt et al.

(10) Patent No.: US 8,707,998 B2
(45) Date of Patent: Apr. 29, 2014

(54) VOLUME ACCUMULATOR

(75) Inventors: Eduard Golovatai-Schmidt, Hemhofen (DE); Mathias Boegershausen, Puschendorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 91 days.

(21) Appl. No.: 13/501,319

(22) PCT Filed: Oct. 14, 2010

(86) PCT No.: PCT/EP2010/065402
§ 371 (c)(1), (2), (4) Date: Apr. 11, 2012

(87) PCT Pub. No.: WO2011/045369
PCT Pub. Date: Apr. 21, 2011

(65) Prior Publication Data

US 2012/0199230 A1 Aug. 9, 2012

(30) Foreign Application Priority Data

Oct. 15, 2009 (DE) ........................ 10 2009 049 459

(51) Int. Cl.
*F16L 55/04* (2006.01)

(52) U.S. Cl.
USPC ................................ 138/31; 138/30; 137/504

(58) Field of Classification Search
USPC ..................... 138/31, 30, 44, 45, 46; 137/504
See application file for complete search history.

(56) References Cited

U.S. PATENT DOCUMENTS

| | | | | |
|---|---|---|---|---|
| 4,765,366 | A * | 8/1988 | Premiski et al. | 137/593 |
| 5,148,834 | A * | 9/1992 | Reinartz et al. | 138/31 |
| 5,996,632 | A * | 12/1999 | Vogel et al. | 138/31 |
| 2011/0226371 | A1 * | 9/2011 | Marin et al. | 138/31 |

FOREIGN PATENT DOCUMENTS

| | | |
|---|---|---|
| DE | 3705642 | 1/1988 |
| DE | 4234217 | 4/1994 |
| DE | 19529277 | 2/1997 |
| DE | 19725240 | 12/1998 |
| DE | 102007041552 | 3/2009 |
| EP | 0184404 | 6/1986 |
| EP | 0806550 | 11/1997 |
| FR | 2740528 | 4/1997 |

* cited by examiner

*Primary Examiner* — Patrick F Brinson
(74) *Attorney, Agent, or Firm* — Volpe and Koenig, P.C.

(57) ABSTRACT

A volume accumulator (15), including a guide housing (33) and a separating element (34), wherein the separating element (34) is slidably mounted on an inner lateral face of the guide housing (33). At least one indentation (41) is located on the guide housing (33), with the indentation protruding into the guide housing (33), wherein in the direction of the separating element (34) the indentation (41) has an open end that serves as a stop for the separating element (34).

3 Claims, 4 Drawing Sheets

VOLUME ACCUMULATOR

FIELD OF THE INVENTION

The invention relates to a volume accumulator having a guide housing and a dividing element, wherein the dividing element is mounted in a displaceable manner on an inner lateral surface of the guide housing.

BACKGROUND

Volume accumulators are used for example in internal combustion engines in order to assist in the supply of pressurized medium to a hydraulic consumer, for example to a camshaft adjuster or an electrohydraulic valve actuating device. Camshaft adjusters are known for example from DE 195 29 277 A1 or from EP 0 806 550 A1.

A volume accumulator is disclosed for example in DE 10 2007 041 552 A1. The volume accumulator has a hollow cylindrical guide housing and has a dividing element, in the illustrated embodiment a pot-shaped piston, which is held in an axially displaceable manner in the guide housing and which divides the interior of the guide housing into a storage space and a complementary space. When the piston is acted on with pressurized medium, it is displaced counter to the force of a spring element in the direction of a stop, as a result of which the volume of the storage space increases at the expense of the volume of the complementary space. Here, the displacement travel of the piston is limited in that an open end of a casing portion of the pot-shaped piston comes to bear against an annular stop which is formed separately from the guide housing. The annular stop bears against a radially running wall on an axial end, on which the spring element is simultaneously supported, of the guide housing.

SUMMARY

It is an objective of the invention to provide a volume accumulator, the manufacturing expenditure for which should be reduced.

The object is achieved according to the invention in that at least one indentation is formed on the guide housing, which indentation projects into the guide housing, wherein the indentation has, in the direction of the dividing element, an open end which serves as a stop for the dividing element.

The volume accumulator has a dividing element, for example a piston, which is mounted in a displaceable manner within a guide housing and which divides a storage space from a complementary space. When said dividing element is acted on by pressurized medium, it is displaced within the guide housing in the direction of a stop which limits the displacement travel of the dividing element in that the latter comes to bear against the stop. The stop secures the dividing element so as to prevent it from inadvertently emerging from the guide housing during the operation thereof. Furthermore, through suitable positioning of the stop between the ends of the guide housing, it is possible to utilize suitable spring strengths and spring lengths and thereby suitably configure the volume accumulator characteristics.

It is provided here that the stop is formed from the material of the guide housing. For this purpose, in the guide housing, which is for example of hollow cylindrical design, a slot is provided which runs along a discontinuous line. Here, the slot runs, at least in regions, in a plane perpendicular to the displacement direction of the piston. The slot may be formed into the guide housing by punching or fine blanking, for example. Provided on the guide housing in the region of the slot is an indentation which projects into the interior of the guide housing. Here, an open end, generated by the slot, of the indentation faces the piston and serves as a stop for the latter. The open end means the region which was connected to the guide housing before the formation of the slot into said guide housing.

In this embodiment, the stop is firstly formed in one piece with the guide housing, such that there is no requirement for additional components. Secondly, there is no material connection between the stop surface and that region of the guide housing which lies in the direction of the piston, such that said transition region is designed to be rectangular, without a radius or phase. It is thus ensured that the dividing element does not become jammed against the stop. Furthermore, the abutment of two surfaces arranged perpendicular to the displacement direction prevents the piston from passing under the indentation and becoming jammed, or the indentation from being pressed outward.

The indentation may take on a multiplicity of forms. Embodiments are for example conceivable in which a slot is formed into the guide housing, which slot is arranged entirely in a plane perpendicular to the displacement direction of the piston. The indentation is subsequently formed into the guide housing in the region of the slot.

Likewise conceivable are embodiments in which the indentation is formed as a lug. Here, a slot which deviates from a straight line is formed into the guide housing, which slot forms a lug which is connected to the guide housing. This lug may for example be triangular or tetragonal and may if appropriate be bulged corresponding to the shape of the guide housing, and projects into the guide housing.

In one physical embodiment of the invention, it is provided that a spring element is arranged in the guide housing, which spring element extends through the region of the indentation, wherein the indentation has a guide portion for the spring element, the length of which guide portion in the direction of force of the spring element is greater than the spacing between two windings of the spring element. The guide portion provides a guide surface for the spring element which exerts a force on the piston counter to the force of the pressurized medium. The spring element may be designed for example as a helical or spiral compression spring. Here, through suitable selection of the length of the guide portion, it is ensured that there is always one winding of the spring element arranged in said region, and therefore the spring element is provided with adequate guidance such that the spring windings do not become jammed against the stop of the lug.

The dividing element may for example be designed as a pot-shaped piston with a base and an adjoining casing portion. The guide housing and the piston are advantageously produced by non-cutting processes from in each case one sheet-metal blank, for example by means of a deep-drawing process. Here, the casing portion of the piston and the inner lateral surface of the guide housing may be designed to be cylindrical or polygonal in cross section, for example. The base of the piston serves as a pressure surface, which is acted on with a force by the pressurized medium flowing in, as a result of which the piston is displaced. The lateral surface serves for mounting the piston in the guide housing, wherein the open end of the casing portion comes to bear against the stop when the volume accumulator is completely full. Furthermore, the sealing of the storage space with respect to the complementary space is realized by means of close-tolerance play between the casing portion and the inner lateral surface of the guide housing.

BRIEF DESCRIPTION OF THE DRAWINGS

Further features of the invention will emerge from the following description and from the drawings, in which exemplary embodiments of the invention are illustrated in simplified form. In the drawings.

DETAILED DESCRIPTION OF THE PREFERRED EMBODIMENTS

Figure 1:
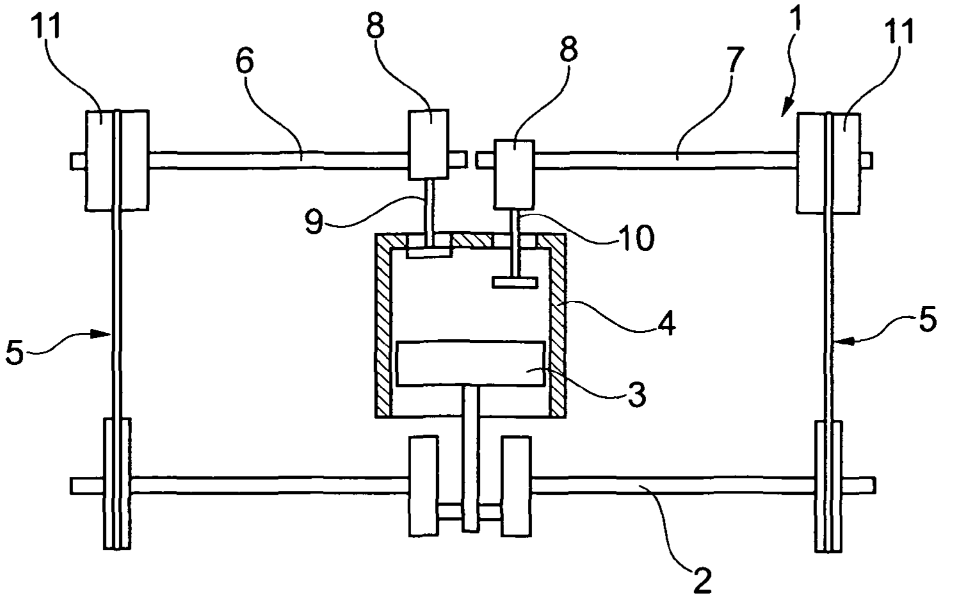
FIG. 1 shows an internal combustion engine merely in highly schematic form.

FIG. 1 depicts an internal combustion engine 1, wherein a piston 3 is shown which is seated on a crankshaft 2 and which is arranged in a cylinder 4. In the embodiment illustrated, the crankshaft 2 is connected via in each case one traction mechanism drive 5 to an intake camshaft 6 and an exhaust camshaft 7, wherein a first and a second camshaft adjuster 11 can effect a relative rotation between the crankshaft 2 and the camshafts 6, 7. Cams 8 of the camshafts 6, 7 actuate one or more intake gas exchange valves 9 or one or more exhaust gas exchange valves 10. Provision may also be made for only one of the camshafts 6, 7 to be equipped with a camshaft adjuster 11, or for only one camshaft 6, 7 to be provided, which is provided with a camshaft adjuster 11.

Figure 3:
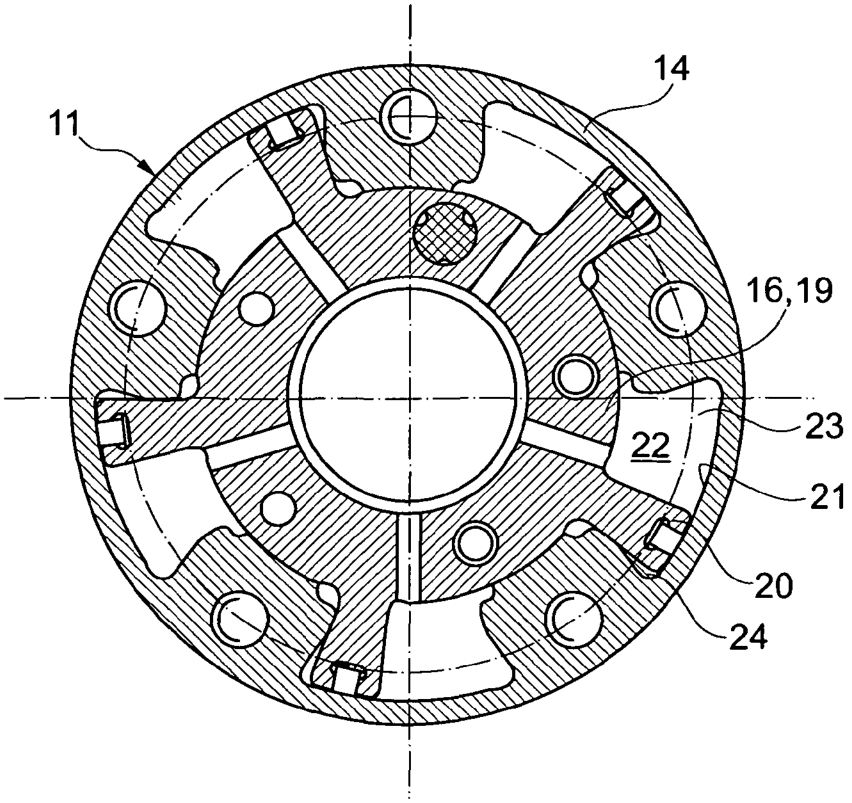
FIG. 3 shows a cross section through the camshaft adjuster from FIG. 2 along the line III-III, wherein the central screw is not illustrated.
Figure 2:
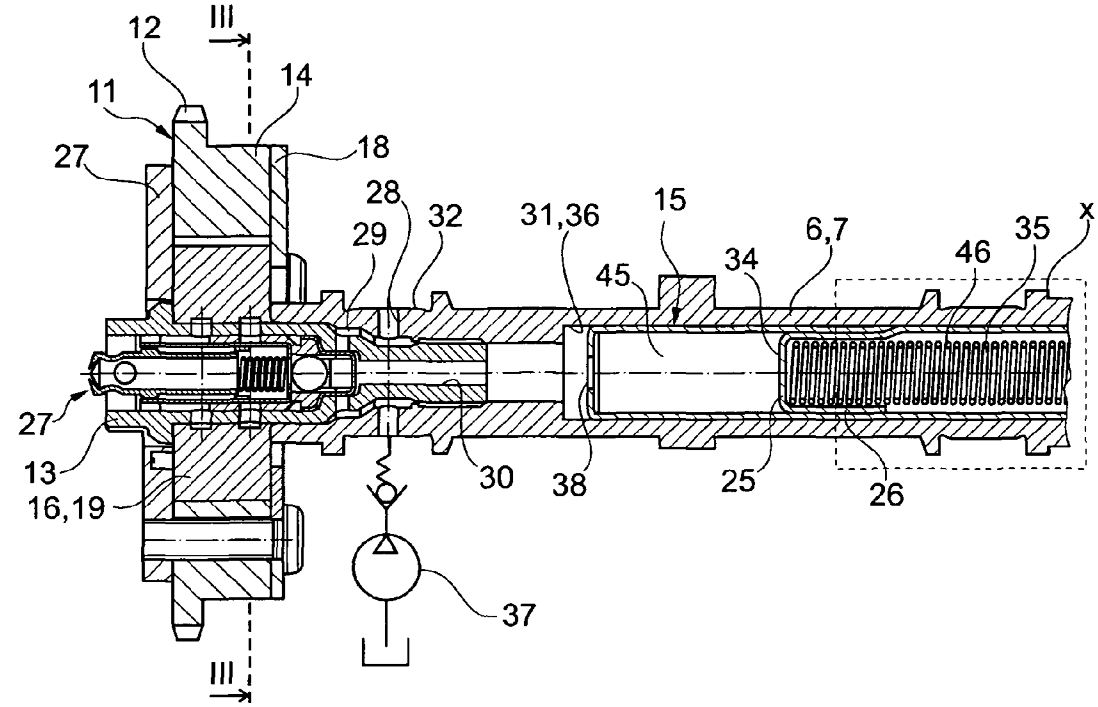
FIG. 2 shows a longitudinal section through a camshaft adjuster which is fastened to a camshaft in which a first embodiment of a volume accumulator is arranged.

FIGS. 2 and 3 show a camshaft adjuster 11 in longitudinal section and cross section. Furthermore, FIG. 2 shows a volume accumulator 15 which is arranged in a camshaft 6, 7 which is connected in a rotationally conjoint manner to the camshaft adjuster 11.

The camshaft adjuster 11 comprises a drive element 14, a driven element 16 and two side covers 17, 18 which are arranged on the axial side surfaces of the drive input element 14. The driven element 16 is designed in the form of a vane wheel and has a hub element 19 which is of substantially cylindrical design and from the external cylindrical lateral surface of which, in the embodiment illustrated, five vanes 20 extend outward in the radial direction.

Five pressure spaces 22 are provided within the camshaft adjuster 11, wherein a vane 20 projects into each pressure space 22. Here, the vanes 20 are designed so as to bear both against the side covers 17, 18 and also against the circumferential wall 21. Each vane 20 thereby divides the respective pressure space 22 into two oppositely-acting pressure chambers 23, 24.

Formed on an external lateral surface of the drive element 14 is a sprocket 12 via which torque can be transmitted from the crankshaft 2 to the drive element 14 by means of a chain drive (not illustrated). The driven element 16 is connected in a rotationally conjoint manner to the camshaft 6, 7 by a central screw 13.

The driven element 16 is arranged so as to be rotatable relative to the drive element 14 over a defined angle range. By supplying pressurized medium to one group of pressure chambers 23, 24 and discharging pressurized medium from the other group, the phase position of the drive element 14 with respect to the driven element 16 (and therefore the phase position of the camshafts 6, 7 with respect to the crankshaft 2) can be varied. By supplying pressurized medium to both groups of pressure chambers 23, 24, the phase position can be held constant.

The camshaft 6, 7 has, in the region of a camshaft bearing 32, a plurality of openings 28 via which pressurized medium delivered by a pressurized medium pump 37 passes into the interior of said camshaft. Formed within the camshaft 6, 7 is a pressurized medium path 29 which communicates at one side with the openings 28 and at the other side with a control valve 27 which serves for the supply of pressurized medium to the camshaft adjuster 11. The control valve 27 is arranged in the interior of the central screw 13. Through use of the control valve 27, pressurized medium can be selectively conducted to the first or second pressure chambers 23, 24 and discharged from the other pressure chambers 23, 24 in each case.

Provided in the interior of the central screw 13 is a pressurized medium duct 30 which communicates at one side with the pressurized medium path 29 and at the other side with a cavity 31 of the hollow camshaft 6, 7. The pressurized medium duct 30 is formed as an axial bore which extends through the threaded portion of the central screw 13.

The volume accumulator 15 is arranged in the cavity 31. The volume accumulator 15 comprises a guide housing 33, a dividing element 34 and a force accumulator which, in the embodiment illustrated, is designed as a spring element 35 in the form of a helical compression spring. The guide housing 33 is connected in a non-positively locking manner to a wall 36 of the cavity 31. Embodiments are also conceivable in which the guide housing 33 is connected in a cohesive or positively locking manner to the wall 36.

The dividing element 34 is arranged in an axially displaceable manner in the interior of the guide housing 33, wherein, in the embodiment illustrated, said dividing element is formed as a pot-shaped piston with a base 25 and a casing portion 26. The dividing element 34 is mounted by the casing portion 26 in an axially displaceable manner in the guide housing 33. The outer lateral surface of the dividing element 34 is matched to the inner lateral surface of the guide housing 33 in such a way that the guide housing 33 is separated in a pressure-medium-tight manner into a storage space 45 axially in front of and a complementary space 46 behind the base 25 of the dividing element 34.

The spring element 35 is supported at one side on a spring support 39 (FIG. 4), which is formed on that end of the guide housing 33 which faces away from the camshaft adjuster 11, and at the other side on the base 25 of the dividing element 34. The spring element 35 therefore loads the dividing element 34 with a force in the direction of the pressurized medium duct 30. The spring support 39 is formed as a radial indentation 47 of the guide housing 33. For this purpose, the cylindrical guide housing 33 has formed into it a first slot 40 which runs in the circumferential direction of the guide housing 33. The guide housing 33 is subsequently deformed radially inward in the region between the first slot 40 and the end facing away from the camshaft. The depth of the indentation 47 thereby produced is selected such that the spring element 35 bears, even at maximum spring eccentricity, against the open end, which has been separated from the guide housing 33 by the first slot 40, of the spring support 39.

Figure 6:
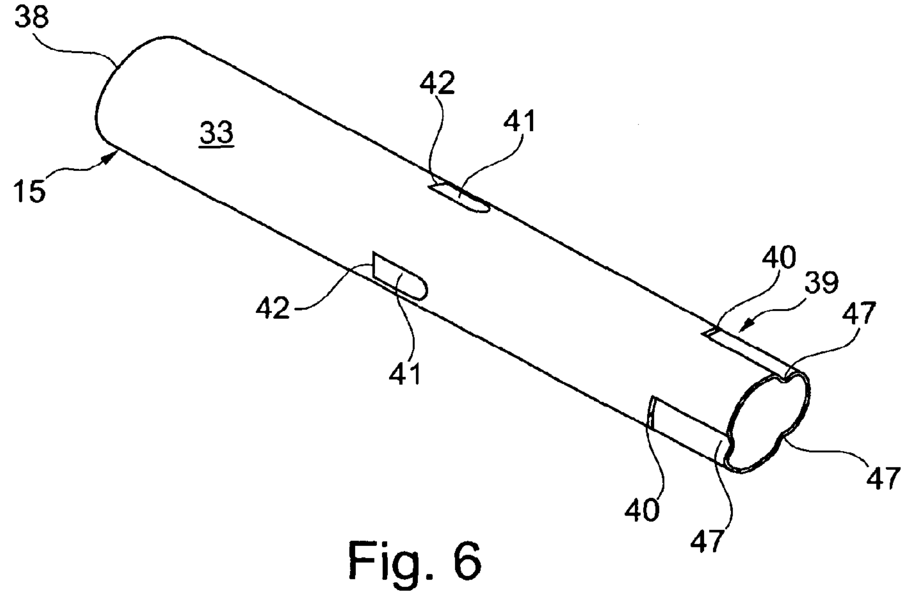
FIG. 6 shows a perspective view of the first embodiment of a volume accumulator.
Figure 4:
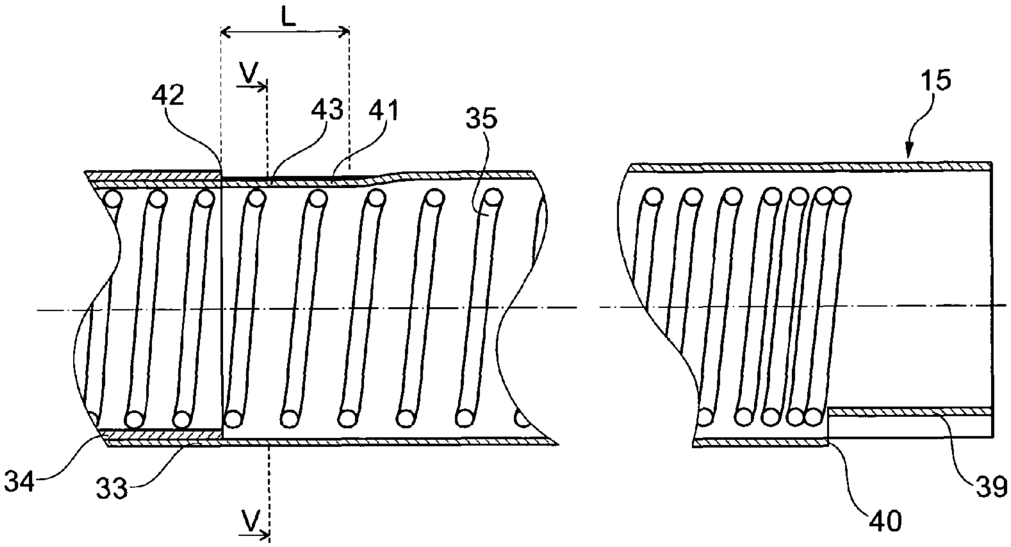
FIG. 4 shows the detail X from FIG. 2 without a camshaft.
Figure 5:
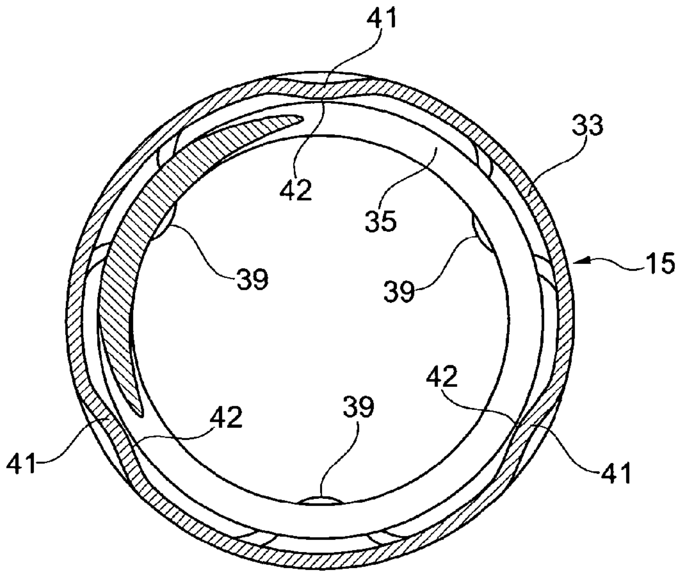
FIG. 5 shows a cross section through the volume accumulator along the line V-V in FIG. 4.

The displacement travel of the dividing element 34 is limited in the direction of the pressurized medium duct 30 by an annular, radially inwardly running portion of the guide housing 33, which portion engages around a housing opening 38 through which pressurized medium can be supplied to the volume accumulator 15. The displacement travel of the dividing element 34 is limited in the direction of the spring support 39 by a stop. The stop is designed, between the axial ends of the guide housing 33, in the form of three indentations 41 which are formed in one piece with and project into the guide housing 33 (FIGS. 4-6). Embodiments are likewise conceivable which have more or fewer indentations. Each indentation 41 has an open end on the side facing toward the dividing element 34, wherein the open end has a surface perpendicular to the direction of movement of the dividing element 34. The production of the indentations 41 takes place in two stages. Firstly, there is formed into the guide housing 33 a second slot 42 which runs in the circumferential direction of the guide housing 33. Subsequently, the material of the guide housing 33 in the region of the second slot 42 is plastically deformed into the guide housing, thus forming the indentation 41.

Each indentation 41 projects into the guide housing 33 such that the open end faces the open end of the casing portion 26 of the dividing element 34 in the displacement direction of the latter. These open ends of the indentations 41 therefore serve as a stop for the dividing element 34.

Furthermore, each indentation 41 has a guide portion 43 which extends in the axial direction and runs parallel to the axis of the spring element 35. Here, the diameter of the spring element 35 is selected such that said spring element bears against the guide portions 43 when it is in the compressed state. The spring element 35 is therefore mounted by means of the guide portions 43, whereby the radial position of the spring element 35 is defined. The length L of the guide portion 43 is greater than the spacing between two spring windings in the relaxed state. It is thereby ensured that, on account of the mounting of the spring element 35 on the guide portions 43, the spring element 35 does not become misaligned or jammed against the stop of the indentation 41.

In the embodiment illustrated, the guide housing 33 and the dividing element 34 are formed as sheet-metal parts produced for example by means of a non-cutting production process, for example a deep-drawing process. Aside from low production costs, this has the advantage that, by means of said shaping process, the bearing surfaces of the casing portion 26 and of the guide housing 33 can be produced with such precision that they do not require any reworking.

Figure 7:
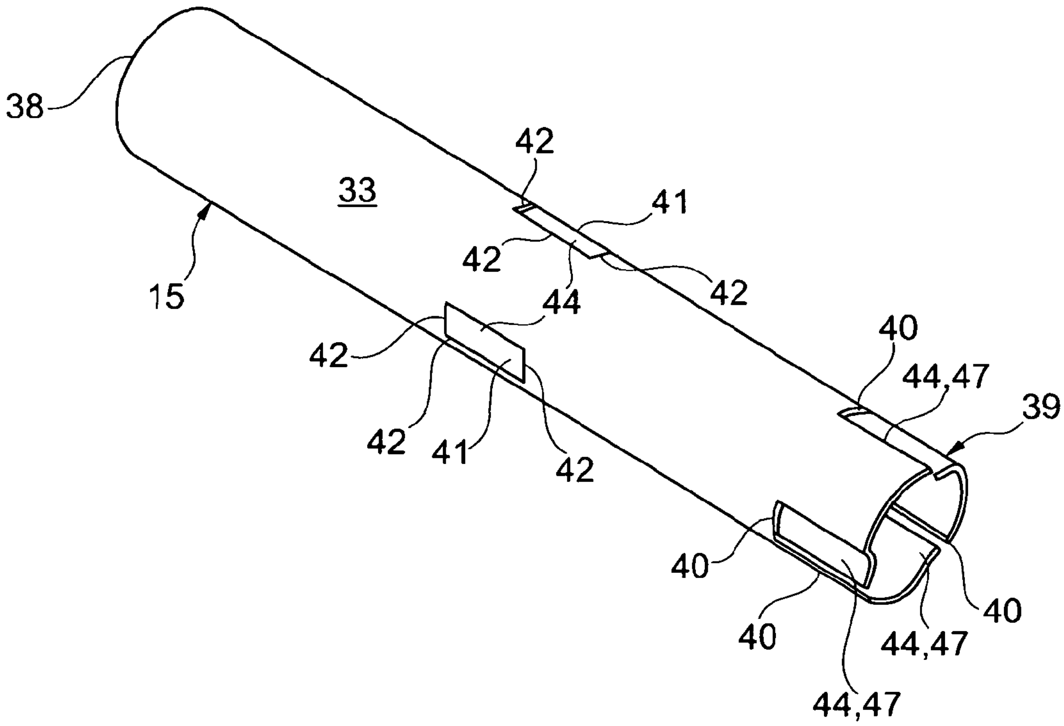
FIG. 7 shows a perspective view of a second embodiment of a volume accumulator.

In an alternative embodiment of a volume accumulator 15, the second slot 42 describes a curved line with two ends, such that a lug 44 is formed which projects into the guide housing 33. A volume accumulator 15 of said type is illustrated in FIG. 7 in a perspective view. In this embodiment, a rectangular lug 44 which projects into the guide housing 33 is formed by means of a U-shaped second slot 42. Here, one limb of the U-shaped slot 42 runs in a plane perpendicular to the movement direction of the dividing element 34, such that the stop is formed. Aside from the embodiment illustrated in FIG. 7, in which the lug 44 is connected to the guide housing 33 in the circumferential direction, embodiments are also conceivable in which the lug 44 merges into the guide housing 33 in the axial direction.

LIST OF REFERENCE SYMBOLS

1 Internal combustion engine
2 Crankshaft
3 Piston
4 Cylinder
5 Traction mechanism drive
6 Intake camshaft
7 Exhaust camshaft
8 Cam
9 Inlet gas exchange valve
10 Outlet gas exchange valve
11 Camshaft adjuster
12 Sprocket
13 Central screw
14 Drive element
15 Volume accumulator
16 Driven element
17 Side cover
18 Side cover
19 Hub element
20 Vane
21 Circumferential wall
22 Pressure space
23 First pressure chamber
24 Second pressure chamber
25 Base
26 Casing portion
27 Control valve
28 Openings
29 Pressurized medium path
30 Pressurized medium duct
31 Cavity
32 Camshaft bearing
33 Guide housing
34 Dividing element
35 Spring element
36 Wall
37 Pressurized medium pump
38 Housing opening
39 Spring support
40 First slot
41 Indentation
42 Second slot
43 Guide portion
44 Lug
45 Storage space
46 Complementary space
47 Indentation
L Length

The invention claimed is:

1. A volume accumulator comprising a guide housing and a dividing element, the guide housing is formed from a sheet-metal blank, the dividing element is mounted in a displaceable manner on an inner lateral surface of the guide housing, at least one indentation is formed on the guide housing, the at least one indentation projects into the guide housing, and the at least one indentation has, in a direction of the dividing element, an open end which serves as a stop for the dividing element.

2. The volume accumulator as claimed in claim 1, wherein a spring element is arranged in the guide housing, said spring element extends through a region of the at least one indentation, wherein the at least one indentation has a guide portion for the spring element, a length of said guide portion in a direction of force of the spring element is greater than a spacing between two windings of the spring element.

3. The volume accumulator as claimed in claim 1, wherein the at least one indentation is formed as a lug.

* * * * *